(12) United States Patent
Kato et al.

(10) Patent No.: US 7,167,768 B2
(45) Date of Patent: Jan. 23, 2007

(54) BOARD WORK SYSTEM HAVING PROVISION FOR ESTABLISHING OPERATING ENVIRONMENT SUITABLE FOR OPERATOR, AND PROCESS OF ESTABLISHING THE SUITABLE OPERATING ENVIRONMENT

(75) Inventors: Mitsuaki Kato, Anjo (JP); Mitsuo Imai, Okazaki (JP)

(73) Assignee: Fuji Machine Mfg., Ltd., Chiryu (JP)

( * ) Notice: Subject to any disclaimer, the term of this patent is extended or adjusted under 35 U.S.C. 154(b) by 740 days.

(21) Appl. No.: 10/206,331

(22) Filed: Jul. 29, 2002

(65) Prior Publication Data

US 2003/0036808 A1  Feb. 20, 2003

(30) Foreign Application Priority Data

Aug. 2, 2001  (JP) .............................. 2001-234861

(51) Int. Cl.
*G06F 19/00* (2006.01)
*G06F 17/50* (2006.01)

(52) U.S. Cl. ........................ 700/121; 700/83; 700/96; 716/15; 716/19

(58) Field of Classification Search ................ 700/95, 700/96, 3, 83, 84, 121; 714/724; 427/96.1, 427/96; 716/1, 2, 3, 7, 8, 9, 10–14, 15, 16, 716/17, 19
See application file for complete search history.

(56) References Cited

U.S. PATENT DOCUMENTS 6,066,206 A * 5/2000 Doyle et al. ................ 427/98.5
6,321,366 B1 * 11/2001 Tseng et al. .................... 716/6
6,336,053 B1 * 1/2002 Beatty ......................... 700/108
6,421,812 B1 * 7/2002 Wang et al. .................... 716/5
6,453,435 B1 * 9/2002 Limon et al. ................ 714/724
6,510,984 B2 * 1/2003 Blankenship et al. ....... 235/375
6,684,264 B1 * 1/2004 Choi ........................... 700/201

FOREIGN PATENT DOCUMENTS

| JP | A 6-12347 | 1/1994 |
|---|---|---|
| JP | A 11-3305 | 1/1999 |
| JP | A 2000-181821 | 6/2000 |

* cited by examiner

*Primary Examiner*—Leo Picard
*Assistant Examiner*—Charles Kasenge
(74) *Attorney, Agent, or Firm*—Oliff & Berridge, PLC

(57) ABSTRACT

A board work system operable by a plurality of operators assigned in turn to operate. The system includes (a) at least one device changeable to each one of a plurality of different modes; (b) a control device which controls the changeable device, and receives operator ID data identifying each operator, so as to recognize which one of the operators is currently assigned to operate the system; and (c) an ID-data input device operable to input the operator ID data to the control device. The control device includes: (b-1) a suitable-mode-establishing-data storing portion which stores suitable-mode-establishing data representative of one of the different modes which is to be established during operation of the system by each operator; and (b-2) a suitable-mode establishing portion which establishes one of the different modes on the basis of the suitable-mode establishing data and according to the operator ID data inputted to the control device.

23 Claims, 13 Drawing Sheets

| Panel | 2 |
|---|---|
| Recipe | GOPLA_12SEQ_QFP100_QFP100_QFP100 |
| Operator | Super |
| Time | 06/15/2000 10:15:56 → 06/15/2000 10:18:28 |
| Status | Canceled |
| Production Mode | |
| Skip Mode | 0x1, 0x0, 0x0, 0x0, 0x0, 0x0, 0x0, 0x0, 0x0, |

Nozzle Error Rate | Slot Error Rate | Total Errors | Close

Select a command. | CCD Monitor | GEM | Side1
Servo Count | JOG:ROBOT1

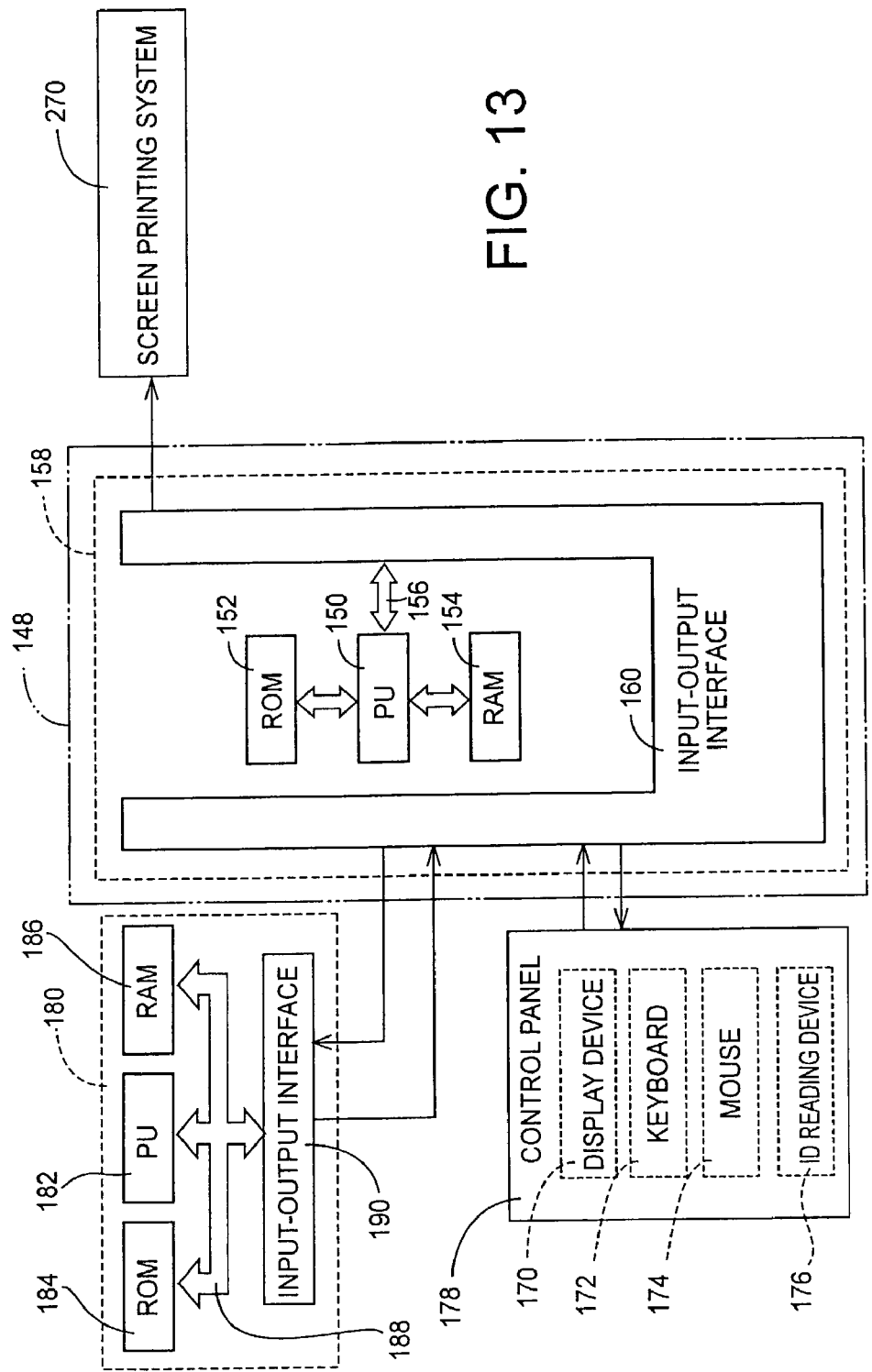

BOARD WORK SYSTEM HAVING PROVISION FOR ESTABLISHING OPERATING ENVIRONMENT SUITABLE FOR OPERATOR, AND PROCESS OF ESTABLISHING THE SUITABLE OPERATING ENVIRONMENT

BACKGROUND OF THE INVENTION

1. Field of the Invention

The present invention relates to a circuit-board work system, and more particularly to techniques for establishing an operating environment suitable for an operator of the circuit-board work system.

2. Discussion of Related Art

There is known a circuit-board work system for achieving a predetermined work on a circuit board. Such a circuit-board work system is operated or managed through a terminal device connected to a control device of the system, in general, wherein the terminal device is commonly used by a plurality of operators who are assigned in turn to operate or manage the circuit-board work system.

It is preferable that each function or device of the system is placed in one of a plurality of different operational modes that is suitable for the currently assigned operator, for example, where the plurality of operators have respective mother languages different from each other. In this case, it is preferable that the corresponding device of the system is placed in such a mode that permits information to be indicated or displayed in one of a plurality of languages that is the most familiar to the currently assigned operator. However, in the conventional circuit-board work system, each time the display language should be switched from one to another, the power of the control device has to be turned off and then newly turned on after a required procedure (e.g., selecting one from among the plurality of languages) is carried out, so that the information are actually displayed in the selected language.

Further, it is preferable to limit commands acceptable by the control device, depending upon ability, job position and other characteristics of the currently assigned operator. Namely, the corresponding device of the control device is preferably placed in such a mode that validates one or ones of the commands which are really required for the currently assigned operator. For example, while the system is being operated by each ordinary or non-supervisor operator who is authorized only to carry out a routine operation for performing a predetermined work on a circuit board, the corresponding device should be placed in a routine mode in which only the commands required for the routine operation are validated to be acceptable by the control device. On the other hand, while the system is being operated by a supervisor operator who supervises the non-supervisor operators, the corresponding device should be placed in a special mode in which not only the routine commands but also special commands are validated to be acceptable by the control device. In the conventional circuit-board work system, a password has to be supplied to the control device, for establishing the special mode or validating the special commands, for example, in the event of a failure of the system. That is, in the event of trouble which can not be resolved by the non-supervisor operator, the password corresponding to each required special command is inputted to the control device by the supervisor operator, so that the required special commands are acceptable by the control device. In other words, the supervisor operator has to necessarily enter the password in the terminal device connected to the control device every time each special command requires to be validated.

Further, in the conventional system in which a working time of each operator is recorded independently of an outcome of the work achieved in the system, it is difficult to exactly know or identify one of the operators who was in charge of the operation on each circuit board in the system. It might be possible to identify the real producer of each circuit board, by checking the working times of the respective operators with the time at which the circuit board in question was produced. However, this kind of checking is cumbersome, and does not necessarily assure correct identification of the real producer.

In the conventional system, all the changeable functions or devices (such as a display device having different display-language modes, a command input device having different command input modes and a outcome data or operator personal data managing device having different managing modes) are placed in the respective modes independently of each other, as described above. Therefore, for establishing an operating environment of the system that is suitable for each one of the operators, a procedure to change a mode into another mode has to be repeated the same number of times as the number of the changeable devices.

SUMMARY OF THE INVENTION

It is therefore an object of the present invention to improve a maneuverability of a board work system. This object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A process of establishing an operating environment of a board work system operable by a plurality of operators who are assigned in turn to operate the system for achieving at least one predetermined work on a circuit board, the board work system including (a) at least one changeable device changeable to each one of a plurality of different modes and (b) a control device which controls the above-described at least one changeable device, and receives operator ID data of each one of the operators so as to recognize which one of the operators is currently assigned to operate the system, the process comprising:

a suitable-mode-establishing-data preparing step of preparing suitable-mode establishing data representative of one of the plurality of different modes which is to be established as the operating environment during operation of the system by each one of the operators;

a suitable-mode-establishing-data storing step of storing the suitable-mode establishing data in a suitable-mode-establishing-data storing portion of the control device; and a suitable-mode establishing step of establishing one of the plurality of different modes on the basis of the suitable-mode-establishing data and according to the operator ID data received by the control device.

In the process defined in this mode (1), the above-described at least one changeable device can be placed in one of the plurality of different modes that is suitable for each operator, by simply inputting the operator ID (identity) data to the control device of the system. Even where the system has a large number of devices each changeable to each one of its plurality of different modes, all the devices can be switched to their respective modes suitable for the currently assigned operator, without having to take a procedure for each of the devices. The above-described plurality of operators may be interpreted to include not only non-supervisor operators who are authorized to merely carry out a routine operation for performing the predetermined work in the system, but also a supervisor operator who serves as a leader of the non-supervisor operators. The above-described suitable-mode-establishing-data preparing step and suitable-mode-establishing-data storing step are preferably implemented by the supervisor operator rather than by the non-supervisor operators. The above-described at least one changeable device may include a display device for displaying information, a data input device for inputting data to the control device of the system, and other devices which enable or facilitate the operation of the system by each operator, namely, which constitutes the operating environment of the system. It is noted that technical features defined in any one of the following modes (3)–(12) may be applied to the process defined in this mode (1).

(2) A board work system operable by a plurality of operators who are assigned in turn to operate the system for achieving at least one predetermined work on a circuit board, the system comprising:

at least one changeable device which is changeable or changeable to each one of a plurality of different modes;

a control device which controls the above-described at least one changeable device, and receives operator ID data identifying each one of the operators, so as to recognize which one of the operators is currently assigned to operate the system; and an ID-data input device operable to input the operator ID data to the control device, wherein the control device includes:

a suitable-mode-establishing-data storing portion which stores suitable-mode establishing data associating the operator ID data of each one of the operators, with one of the plurality of different modes that is to be established during operation of the system by the each one of the operators; and a suitable-mode establishing portion which establishes one of the plurality of different modes on the basis of the suitable-mode establishing data and according to the operator ID data inputted to the control device.

In the board work system constructed according to this mode (2) of the invention, the currently assigned operator is identified based on the operator ID data inputted to the control device of the system, so that the above-described at least one changeable device can be automatically placed in one of the plurality of different modes that is suitable for the operator who is identified by the inputted operator ID data. Thus, the operating environment of the system can be easily adapted to be suitable for the currently assigned operator, without necessity of complicated or cumbersome manipulation. The suitable-mode-establishing data may be considered to associate the operator ID data of each operator, with one of the different modes that is the most suitable for the operator.

(3) A board work system according to mode (2), wherein the ID-data input device includes a manual input device operable manually by the operator.

(4) A board work system according to mode (2) or (3), wherein the ID-data input device includes a reading device which accesses a recording medium storing the operator ID data, for reading the operator ID data stored in the recording medium.

The reading device may be provided by a device for accessing a magnetic storage, a bar-code reader for reading bar codes, or other kind of reading device.

(5) A board work system according to any one of modes (2)–(4), comprising a display device, as the above-described at least one changeable device, which displays information facilitating the operation of the system by each one of the operators and which is changeable to each one of a plurality of different display modes as the plurality of different modes, wherein the suitable-mode establishing portion includes a display-mode establishing portion which establishes one of the plurality of different display modes on the basis of the suitable-mode establishing data and according to the operator ID data inputted to the control device.

The display device may have a plurality of different displays, such as a main display and a log-on display, each of which is switchable to the other. In this case, the display device has the plurality of different display modes in each of the plurality of different displays, so that the display-mode establishing portion establishes a selected one of the plurality of different display modes in each of the plurality of different displays. It is noted that the suitable-mode establishing portion of the control device may include the display-mode establishing portion as defined in this mode (5), an input-mode establishing portion as defined in mode (7) and/or a command-input-mode establishing portion as defined in mode (9).

(6) A board work system according to mode (5), wherein the display device displays the information in a selected one of plurality of different languages, and wherein the display-mode establishing portion of the suitable-mode establishing portion includes a display-language selecting portion which selects one of the plurality of different languages on the basis of the suitable-mode establishing data and according to the operator ID data inputted to the control device.

In the conventional circuit-board work system, each time the display language should be switched from one to another, the power of the control device has to be turned off and then newly turned on after a required procedure (e.g., selecting one from among the plurality of languages) is carried out. In the board work system constructed according to this mode (6) of the invention, the display device is automatically placed in such a mode that permits the information to be displayed in one of the plurality of languages that is the most familiar to each operator, in accordance with the inputted operator ID data, upon initiation of the operation of the system by each operator. It is noted that the plurality of different languages may be, for example, English, Japanese, Germany, French, Chinese, Portuguese and Spanish.

(7) A board work system according to any one of modes (2)–(6), comprising a data input device, as the above-described at least one changeable device, which is operable to input data to the control device and which is changeable to each one of a plurality of different input modes as the plurality of different modes, wherein the suitable-mode establishing portion includes an input-mode establishing portion which establishes one of the plurality of different input modes on the basis of the suitable-mode establishing data and according to the operator ID data inputted to the control device.

The data input device defined in this mode (7) may be provided by the above-described ID-data input device, or independently of the ID-data input device.

(8) A board work system according to mode (7), wherein the data input device includes a keyboard which is changeable to each one of a plurality of different keyboard input modes as the plurality of different input modes, and wherein the input-mode establishing portion of the suitable-mode establishing portion includes a keyboard-input-mode establishing portion which establishes one of the plurality of different keyboard input modes on the basis of the suitable-mode establishing data and according to the operator ID data inputted to the control device.

(9) A board work system according to mode (7) or (8), controllable in accordance with various commands which are inputted to the control device, wherein the data input device includes a command input device changeable to each one of a plurality of different command input modes in which respective valid-command groups are constituted differently from each other, such that each one of the valid-command groups is constituted by at least one of the various commands that can be inputted to the control device through the command input device while the command input device is placed in a corresponding one of the plurality of different command input modes, and wherein the suitable-mode establishing portion includes a command-input-mode establishing portion which establishes one of the plurality of different command input modes on the basis of the suitable-mode establishing data and according to the operator ID data inputted to the control device.

The above-described suitable-mode-establishing data may include data representative of a selected one of the plurality of different command input modes which is to be established during operation of the system by each one of the operators. While each one of the plurality of different command input modes is being established, a command or commands which are not included in the corresponding valid-command group can not be inputted to the control device of the system. That is, the commands excluded from the valid-command group are automatically invalidated so as to be unacceptable by the control device. This arrangement eliminates necessity of using a password for restricting use of each command, thereby improving the maneuverability of the board work system. Further, owing to this arrangement, the system can be operated with a higher degree of reliability or safety, than where each command is protected from being used by a password which might be stolen. It is noted that the various commands include a command required for a routine operation of the system, a command required for maintenance of the system, a command required for reading or inputting data for supervising the operators, and a command required for inputting or editing the suitable-mode establishing data.

(10) A board work system according to mode (9), wherein the command input device includes a valid-command indicator which indicates the above-described at least one of the various commands constituting each one of the valid-command groups, so that each one of the operators is informed that the above-described at least one of the various commands can be inputted to the control device.

(11) A board work system according to any one of modes (7)–(10), controllable in accordance with various commands which are inputted to the control device, and comprising a display device which displays information facilitating the operation of the system by each one of the operators, wherein the data input device includes a valid-command indicator which displays at least one of the various commands in the display device and which is changeable to each one of a plurality of different indication modes, and a command select device which selects one of the above-described at least one of the various commands that is displayed by the valid-command indicator, for thereby inputting the selected command to the control device, and wherein the suitable-mode establishing portion includes a valid-command-indication-mode establishing portion which establishes one of the plurality of different indication modes on the basis of the suitable-mode establishing data and according to the operator ID data inputted to the control device.

The valid-command indicator may be provided by an icon or other pictorial representation displayed in the display device. The command select device may be provided by a keyboard, or alternatively by a trackball, mouse, lightpen, touchscreen, joystick or other pointing device for positioning a cursor on a display of the display device. That is, a desired command can be inputted to the control device, for example, by entering predetermined code data with the keyboard, or alternatively by clicking or pointing the pictorial representation representative of the desired command, with the pointing device. It is noted that the keyboard can be considered also as a kind of the pointing device since it is also possible to point the displayed pictorial representation by using the keyboard.

In the board work system constructed according to this mode (11), the valid-command indicator may be changeable to each one of the plurality of indication modes, such that the plurality of indication modes have respective different limitations on the valid commands which are to be displayed in the display device, or such that the plurality of indication modes have respective different manners for deleting invalid commands which are to be prohibited from being inputted to the control device, from the display of the display device, or such that the plurality of indication modes have respective different groups of the invalid commands. Where the plurality of indication modes have the respective different limitations on the valid commands, the suitable-mode establishing portion may include a valid-command-limitation establishing portion. Where the plurality of indication modes have the respective different manner for deleting the invalid commands from the display, the suitable-mode establishing portion may include an invalid-command-deleting-manner establishing portion. Where the plurality of indication modes have the respective different groups of the invalid commands, the suitable-mode establishing portion may include an invalid-command-group establishing portion.

It is preferable that only the valid commands are displayed on the display with the invalid commands being deleted from the display, for effectively using the space of the display. Further, it is preferable to invalidate function keys of the keyboard which keys are used for inputting the invalid commands, so that the invalid commands are prevented from being erroneously inputted through the keyboard to the control device.

(12) A board work system according to any one of modes (2)–(11), wherein the control device includes:

an outcome-data generating portion which generates outcome data representative of outcome achieved by each one of the operators in the system; and a data combining portion which combines operator personal data representative of information related to each one of the operators, with the outcome data of a corresponding one of the operators.

The operator personal data may include data representing a name, job experience years, age, sex and other information proper to each operator. The outcome data into which the operator personal data are incorporated facilitate the management of the operators.

(13) A board work system according to any one of modes (2)–(12), further comprising a component mounting device which mounts an electric component onto the circuit board.

(14) A board work system according to any one of modes (2)–(12), further comprising:

a board holding device which holds the circuit board positioned in a predetermined position;

an applying head which applies a viscous fluid to a plurality of predetermined portions of the circuit board which is held by the board holding device; and a relative movement device which moves the board holding device and the applying head relative to each other.

(15) A board work system according to any one of modes (2)–(12), further comprising a screen printing device which prints a print material on a plurality of predetermined portions of the circuit board, by forcing the print material into apertures of a mask screen, which is disposed on the circuit board such that the apertures of the mask screen are aligned with the plurality of predetermined portions of the circuit board.

(16) A board work system operable by a plurality of operators who are assigned in turn to operate the system for achieving at least one predetermined work on a circuit board, the system comprising:

a operating-environment changing device which changes an operating environment of the system to each one of a plurality of different modes, a control device which controls the operating-environment changing device, and receives operator ID data identifying each one of the operators, so as to recognize which one of the operators is currently assigned to operate the system; and an ID-data input device operable to input the operator ID data to the control device;

wherein the control device includes:

a suitable-mode-establishing-data storing portion which stores suitable-mode establishing data associating the operator ID data of each one of the operators, with one of the plurality of different modes that is to be established during operation of the system by the each one of the operators; and a suitable-mode establishing portion which establishes one of the plurality of different modes on the basis of the suitable-mode establishing data and according to the operator ID data inputted to the control device.

The operating environment may be constituted by a display device for displaying information, a data input device for inputting data to the control device of the system, and other devices which enable or facilitate the operation of the system by each operator.

(17) A computer program for executing the process defined in mode (1).

It is noted that technical features defined in any one of the above described modes (3)–(16) may be applied to the program defined in this mode (17).

(18) A recording medium which stores the program defined in mode (17) and which is accessible by a computer so that the stored program can be read by the computer.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 9 is a view of still another one of the plurality of displays:

FIG. 13 is a block diagram showing a screen printing system constructed according to still another embodiment of the invention.

DETAILED DESCRIPTION OF THE PREFERRED EMBODIMENTS

Figure 1:
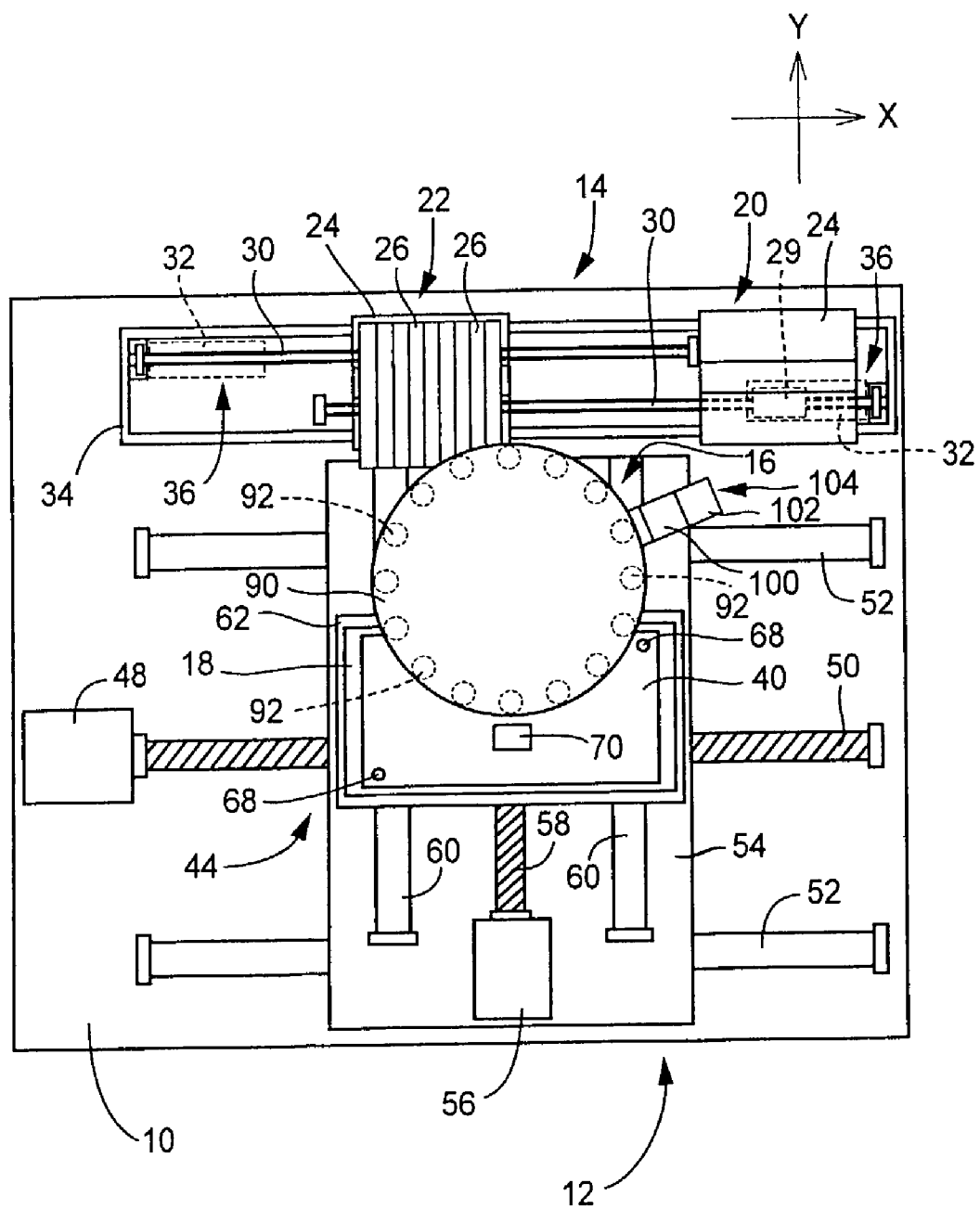
FIG. 1 is an upper plan view of an electronic-component mounting system constructed according to one embodiment of the invention.

There will be described an electronic-component mounting system which is constructed according to one embodiment of this invention. In FIG. 1, reference numeral 10 denotes a machine base of an electronic-component mounting system 12 as a kind of electric-component mounting system. On the base 10, there are mounted a component supplying device 14, a component mounting device 16 and a board holding device in the form of a printed-wiring-board holding device 18, which cooperate to constitute the electronic-component mounting system 12.

The component supplying device 14 includes at least one component supplying table, for example, two component supplying tables 20, 22. Each of the component supplying tables 20, 22 has a feeder support table 24 and a plurality of feeders 26 mounted on the feeder support table 24. Although the detailed illustration is not provided, each of the feeders 26 is arranged to feed a carrier tape which accommodates electronic components each of which is a kind of electric component.

The carrier tape includes a carrier substrate which has a multiplicity of component-accommodating recesses. The electronic components are accommodated in the respective component-accommodating recesses, and the opening of each recess is closed by a covering film bonded to the carrier substrate. The carrier tape is fed by a tape feeding device (not shown) while the covering film is separated from the carrier substrate. Thus, the electronic components are fed to a component supplying portion and then supplied one after another from the component supplying portion. The plurality of feeders 26 are removably mounted on each of the feeder support tables 24 such that the component supply portions of the feeders 26 are arranged along a straight line, for example, along a horizontal straight line in the present embodiment. The direction of the arrangement of the component supply portions is referred to as an X-axis direction (right and left direction in FIG. 1).

Each of the feeder support tables 24 is moved in the X-axis direction while being guided by a guide device including a pair of guide rails 34, by rotation of a feed screw in the form of a ball screw 30 by a support-table driving motor 32, so that a selected one of the feeders 26 can be moved to a component supply position. Each of the feeder support tables 24 is fixed to a nut 29 which is engaged with the ball screw 30. The nut 29, the ball screw 30 and the support-table driving motor 32 cooperate to constitute a major portion of the component-supplying-device moving device 36. The two component supplying tables 20, 22 are thus moved by the respective component-supplying-device moving device 36, independently of each other. The pair of guide rails 34 are used commonly for guiding the movements of the two component supplying tables 20, 22. Since the electronic components are supplied by the two component supplying tables 20, 22 in a known manner as disclosed in JP-B2-H8-21791, the explanation is not provided. It is noted that the nut 29 which is fixed to the feeder support table 24 of the component supplying device 22 is not shown in FIG. 1, and that the feeders 26 which are mounted on the feeder support table 24 of the component supplying device 20 are not shown in FIG. 1.

The printed-wiring-board holding device 18 holds a circuit board in the form of a printed-wiring panel or board 40 such that the printed-wiring board 40 maintains a horizontal posture. The printed-wiring-board holding device 18 is moved to an arbitrary position on an X-Y plane by a board holding and moving device in the form of a horizontal movement device 44. This horizontal movement device 44 includes an X-axis feed screw in the form of a ball screw 50, an X-axis slide driving motor 48 for rotating the ball screw 50, an X-axis slide 54 which is to be moved in the X-axis direction, a Y-axis feed screw in the form of a ball screw 58 provided on the X-axis slide 54, a Y-axis slide driving motor 56 for rotating the ball screw 58, and a Y-axis slide 62 which is to be moved in a Y-axis direction that is perpendicular to the X-axis direction. As the ball screw 50 is rotated by the X-axis slide driving motor 48, the X-axis slide 54 is moved in the X-axis direction while being guided by a pair of guide rails 52. Similarly, as the ball screw 58 is rotated by the Y-axis slide driving motor 56, the Y-axis slide 62 is moved in the Y-axis direction while being guided by a pair of guide rails 60.

The printed-wiring board 40 is supported from below by the printed-wiring-board holding device 18 which is disposed on the Y-axis slide 62. The printed-wiring board 40 has a work surface in the form of a top surface provided with a plurality of predetermined portions on which a plurality of electronic components are to be mounted. With movement of the printed-wiring-board holding device 18 relative to the component mounting device 16, the plurality of portions of the top surface of the printed-wiring board 40 are sequentially positioned in a component mounting position in which the electronic components are to be mounted by the component mounting device 16.

A plurality of reference marks, for example, two reference marks 68 are provided on the top surface of the printed-wiring board 40. A reference-mark camera 70 as an image taking device is fixed to a holding member (not shown) provided in the component mounting device 16, so as to be held stationary. The reference-mark camera 70 is positioned above the reference marks 68, for taking images of the reference marks 68.

The reference-mark camera 70 is a CCD camera includes a matrix of solid image sensors in the form of CCDs (charge-coupled devices) and a lens system (including an imaging lens), and functions as an image-taking device in the form of a surface-imaging device capable of taking a two-dimensional image of an object at one time. The CCDs are small-sized light receiving elements arranged in a matrix in a plane. Each of the light receiving elements generates an electric signal depending upon an amount of light received. The matrix of the light receiving elements defines an imaging area in which an image of the object is formed. It is noted that an illuminating device (not shown) is provided to illuminate the object and its vicinity when the image of the object is taken by the reference-mark camera 70.

The component mounting device 16 is constructed as a mounting device described in JP-A-H6-342998. In an example of the illustration, the mounting device 16 is equipped with an intermittent rotary disk 90 which is intermittently rotatable about an axis, e.g., a vertical axis. The intermittent rotary disk 90 is equipped with a plurality of holding heads, e.g., sixteen holding heads 92, such that the holding heads 92 are equiangular spaced from each other along a circle having its center on the axis of rotation of the intermittent rotary disk 90. With activation of an intermittent rotation motor 94 (see FIG. 2), the intermittent rotary disk 90 is intermittently rotated about the vertical axis by a predetermined angle, for each intermittent rotary motion. Thus, the holding heads 92 are turned about a vertical axis of turning that is parallel with the axis of rotation of the intermittent rotary disk 90, whereby the holding heads 92 are sequentially moved to and stopped at a plurality of stop positions. Each holding head 92 may be referred to as a mounting head, since the holding head 92 receives the electronic component from the component supplying device 14 and then mount the electronic component onto the printed-wiring board 40.

Each holding head 92 carries a plurality of nozzle holders, e.g., six nozzle holders (not shown) which are equi-angularly spaced apart from each other about a horizontal axis perpendicular to the above-described vertical axis. The nozzle holders hold respective suction nozzles each of which is adapted to suck the electronic component with a vacuum pressure. Thus, the suction nozzles are held by the holding head 92 such that the suction nozzles radially extend and are equi-angularly spaced apart from each other and such that the suction nozzles are turnable about the above-described horizontal axis.

The sixteen holding heads 92 are given respective head identification codes, and the six nozzle holders of each holding head 92 are given respective nozzle-holder identification codes. The nozzle-holder identification codes representative of the nozzle holders are stored, in relation to suction-nozzle data sets representative of the respective suction nozzles held by the respective nozzle holders. The kind of the suction nozzle of each holding head 92 placed in the operating position is represented by the head identification code, the nozzle-holder identification code and the suction-nozzle data.

There is provided a component-posture detecting position between a component-receiving position in which the holding head 92 receives the electronic component from the component supplying device 14, and a component-mounting position in which the holding head 92 mounts the electronic component onto the printed-wiring board 40. In the component-posture detecting position, there is disposed a component-image taking device 104 which is constituted by a plurality of component cameras, e.g., two component cameras 100, 102, a light guiding device and an illuminating device (not shown). The component cameras 100, 102, which are constructed as disclosed in JP-A-H5-196441, will be described only briefly.

Like the reference-mark camera 70, each of the component cameras 100, 102 is a CCD camera which includes CCDs and a lens system and which is an image-taking device in the form of a surface-imaging device capable of taking a two-dimensional image of an object at one time. Each component camera 100, 102 has an imaging area perpendicular to its centerline and having a center lying on its centerline. The two component cameras 100, 102 have respective different ratios or times of magnification. The component camera 100 has a comparatively low magnification ratio but has a comparatively wide field of view, while the component camera 102 has a comparatively high magnification ratio but has a comparatively narrow field of view. The two component cameras 100, 102 are selectively used depending upon the size of the electronic component.

Figure 2:
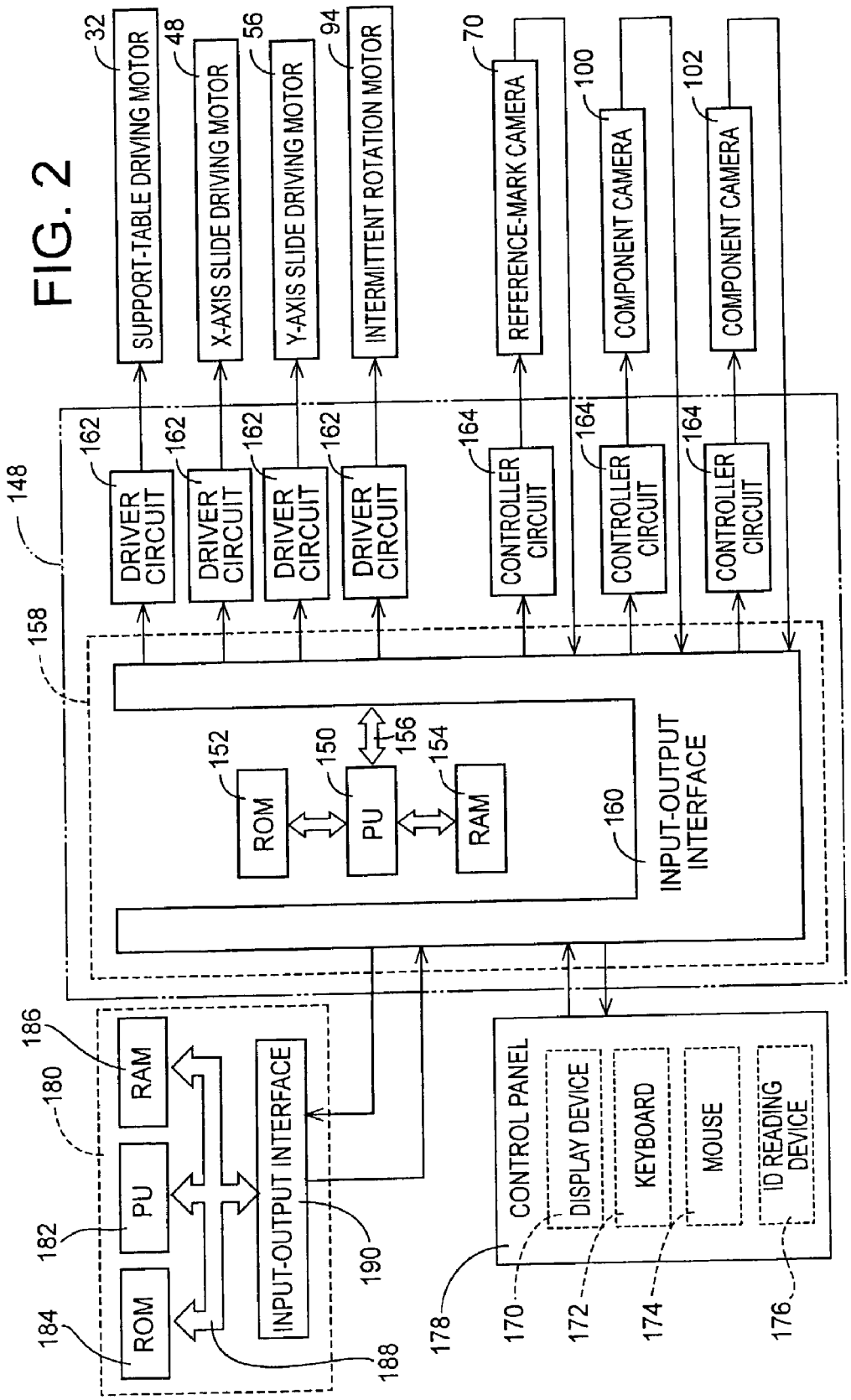
FIG. 2 is a block diagram showing a control device of the electronic-component mounting system of FIG. 1.

The present electronic-component mounting system 12 includes a controller 148 as shown in FIG. 2. The controller 148 is principally constituted by a computer 158 including a processing unit (PU) 150, a read-only memory (ROM) 152, a random-access memory (RAM) 154 and a bus 156 interconnecting those elements 150, 152 and 154. To the bus 156, there is connected an input-output interface 160 to which are connected the above-described motors 32, 48, 56, 94 through respective driver circuits 162. To the input-output interface 160, there are also connected the reference-mark camera 70 and the two component cameras 100, 102 through respective controller circuits 164. Further, to the input-output interface 160, there are also connected a display device 170 as an indication device, a keyboard 172 and a mouse 174 as data input devices, and an ID reading device 176 as an ID-data input device. In the present embodiment, the ID reading device 176 includes a magnetic information reading device capable of reading magnetic information as stored in an ID card which stores operator ID data. The ID reading device 176 cooperates with the display device 170, the keyboard 172 and the mouse 174 to constitute a control panel 178 serving as a terminal device.

The ID reading device 176 may include, in stead of the magnetic information reading device, a bar-code reader capable of reading information in the form of bar codes, or any other kind of reading device capable of reading information otherwise recorded in a storage medium. This ID reading device 176 is not essential, since it is also possible to input the operator ID data to the controller 148 by manipulating the keyboard 172.

Further, to the input-output interface 160 of the controller 148, there is also connected a host computer 180. Like the computer 158, the host computer 180 includes a processing unit (PU) 182, a read-only memory (ROM) 184, a random-access memory (RAM) 186 and a bus 188 interconnecting those elements 182, 184 and 186. To the bus 188, there is connected an input-output interface 190 to which are connected the computer 158 of the controller 148. The RAM 186 of the host computer 180 stores various control programs and data, such as a program for executing a component-mounting control routine for mounting the electronic components onto the printed-wiring board 40, a program for executing a suitable-mode-establishing-data input routine (which is described below), a program for executing an operating-environment establishing routine (which is described below) and suitable-mode establishing data (which are described below). These programs and data stored in the RAM 186 of the host computer 180 are loaded to the controller 148 as needed. It is noted that the host computer 180 cooperates with the controller 148 to constitute a control device in the present embodiment.

Basic operations of the electronic-component mounting system 12 constructed as described above to mount the electronic component on the printed-wiring board 40 are well known in the art, as disclosed in JP-B2-H8-21791, and will be briefly described.

When the electric component is mounted on the printed-wiring board 40, the suction nozzle selected on the holding head 92 positioned in the component-receiving position picks up the electronic component by suction from the component-supplying device 14. Then, the holding head 92 is rotated, if necessary, for changing the posture of the electronic component in the component-posture changing position. After the posture of the electronic component is changed, the image of the electronic component is taken by the component cameras 100, 102 in the component-posture detecting position.

The taken image of the electronic component is compared with a reference or nominal image, to calculate errors as to the positioning of the electronic component as held by the holding head 92. The errors include center positioning errors or horizontal positioning errors $\Delta XE$ and $\Delta YE$, and also an angular positioning error $\Delta\theta$. In the component-posture rectifying position, the holding head 92 is rotated by the component-posture rectifying device, to adjust the angular position of the electronic component for compensation for the angular positioning error $\Delta\theta$.

Distances of movements of the printed-wiring-board holding device 18 in the X-axis and Y-axis directions for mounting the electronic component on the printed-wiring board 40 are adjusted for compensation for the XY positioning errors $\Delta XE$ and $\Delta YE$. According to the adjusted distances of movement, the printed-wiring-board holding device 18 is moved by the horizontal movement device 44 to move the printed-wiring board 40 so that the component-mounting spot on the board 40 at which the electronic component is to be mounted is aligned with the component-mounting position of the holding head 92. Accordingly, the electronic component can be mounted at the nominal component-mounting position on the printed-wiring board 40, in the predetermined posture. In this instance, the adjustment of the movement distances of the printed-wiring-board holding device 18 is effected while taking into account the XY positioning errors $\Delta XP$ and $\Delta YP$ of the printed-wiring board 40, and the positioning error of the sucking position of the electronic component which has been caused by the angular position adjustment in the component-posture rectifying position for compensation for the angular positioning error $\Delta\theta$. Before initiation of the operation to mount the electronic components on the printed-wiring board 40, the images of the reference marks 68 provided on the board 40 are taken by the reference-mark camera 70. On the basis of image data indicative of the image of the reference marks 68, XY positioning errors of the printed-wiring board 40 are calculated. On the basis of the calculated XY positioning errors of the board 40, XY positioning errors $\Delta XP$ and $\Delta YP$ of each component-mounting spots on the printed-wiring board 40 are calculated.

In the component-mounting position, the suction nozzle mounts the electronic component onto the printed-wiring board 40. Then, the holding head 92 is stopped in the angular-head-position resetting position in which the holding head 92 is rotated to its angular zero position, from the angular position which has been established in the component-posture rectifying position to eliminate the angular positioning error $\Delta \theta$ of the electronic component. The holding head 92 is thus returned to its component-receiving angular position in which the electronic component has been transferred from the component supplying device 14 to the suction nozzle. The operation for mounting each electronic component onto the printed-wiring board 40 is completed with the return of the holding head 92 to its component-receiving angular position.

In the component-mounting position, the suction nozzle mounts the electronic component onto the printed-wiring board 40. Then, the holding head 92 is stopped in the angular-head-position resetting position in which the holding head 92 is rotated to its angular zero position, from the angular position which has been established in the component-posture rectifying position to eliminate the angular positioning error $\Delta 74$ of the electronic component. The holding head 92 is thus returned to its component-receiving angular position in which the electronic component has been transferred from the component supplying portion device 14 to the suction nozzle. The operation for mounting each electronic component onto the printed-wiring board 40 is completed with the return of the holding head 92 to its component-receiving angular position.

The above-described component mounting operation is carried out by a plurality of operators who assigned in turn to operate the electronic-component mounting system 12. In the present embodiment, when each of the operators starts operating of the system 12, each operator inputs his operator ID data and password to the controller 148, for logging on the host computer 180. The system 12 includes various functions or devices each of which is automatically placed in one of its plurality of modes that is suitable for the operator who has logged on the host computer 180, as described below in detail. It is noted that the above-described plurality of operators include not only non-supervisor operators (ordinary operators) but also a supervisor operator who supervises the non-supervisor operators.

The RAM 186 of the host computer 180 includes a suitable-mode-establishing-data storing portion which stores suitable-mode establishing data representative of one of the plurality of modes which is to be established during operation of the system 12 by each of the operators. The suitable-mode establishing data are prepared and then inputted to the suitable-mode-establishing-data storing portion by the supervisor operator.

Figure 3:
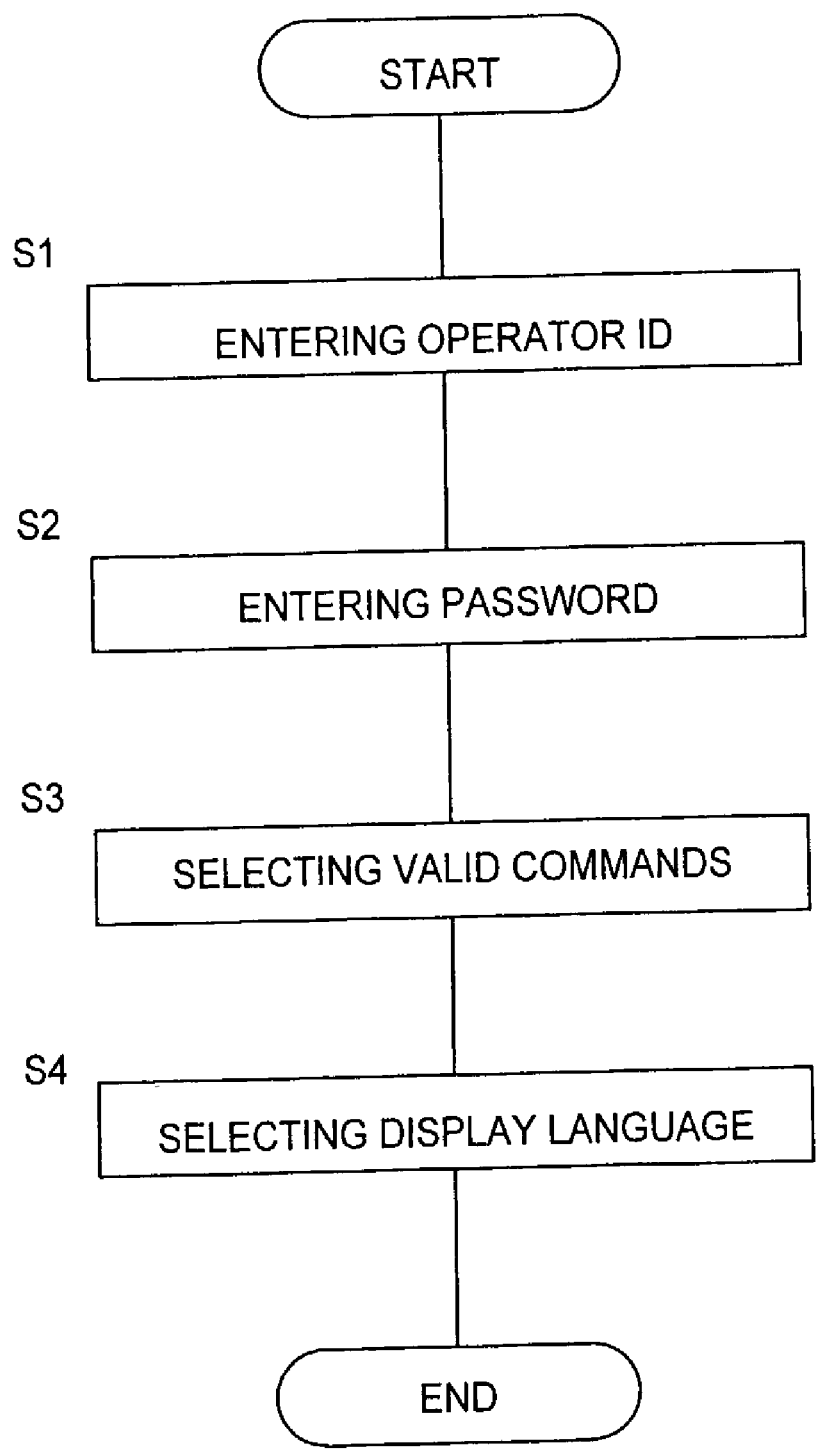
FIG. 3 is a flow chart illustrating a suitable-mode-establishing-data input routine executed according to a program stored in a RAM of the control device of FIG. 2.

FIG. 3 is a flow chart illustrating a suitable-mode-establishing-data input routine, which is executed in response to a suitable-mode-establishing-data input command given by the supervisor operator who has logged in the host computer 180. This suitable-mode-establishing-data input routine is initiated with step S1 in which the supervisor operator is requested to enter his operator ID. After the supervisor operator has entered his operator ID through the keyboard 172, step S2 is implemented to request the supervisor operator to enter his password.

Figure 5:
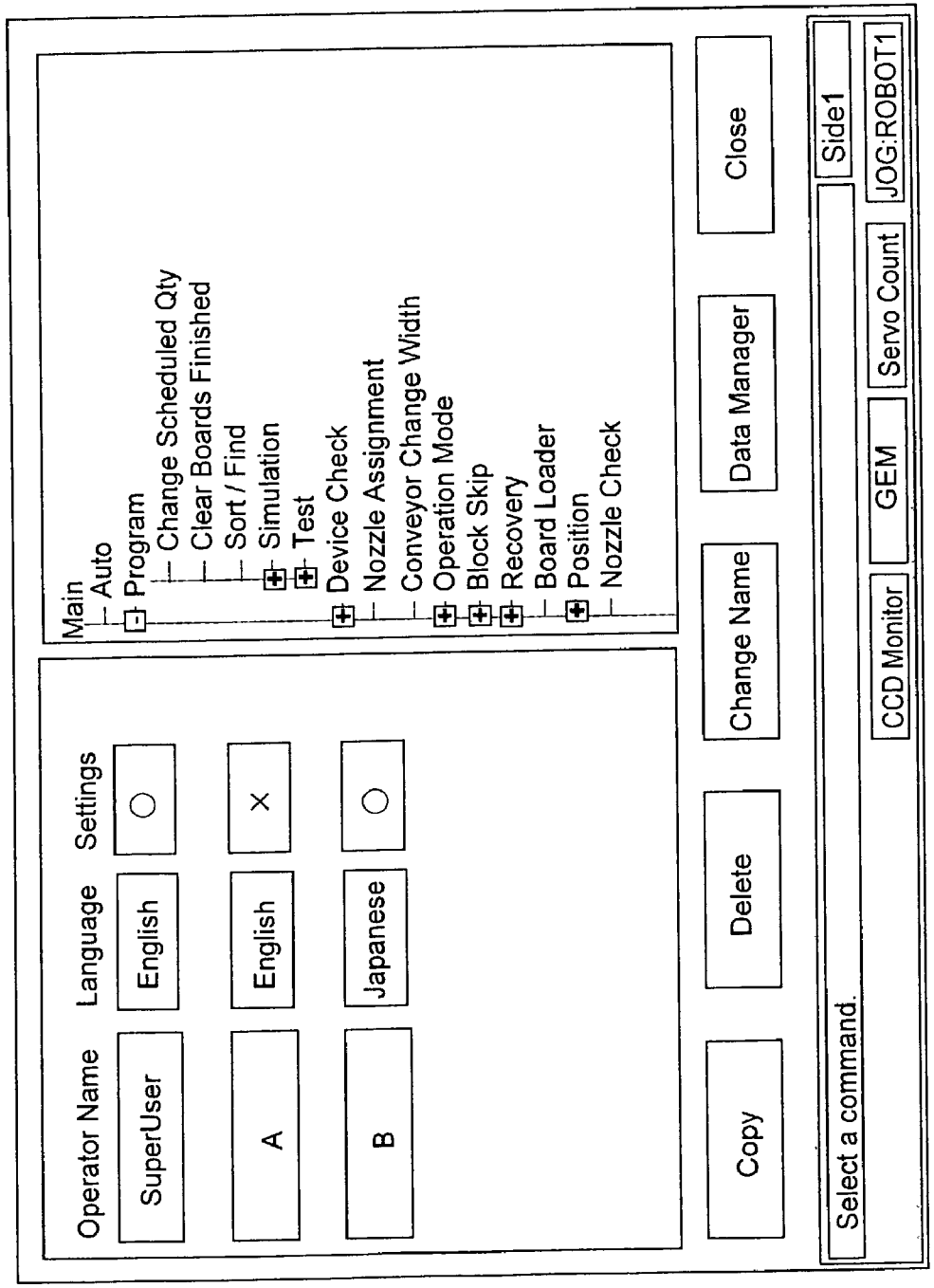
FIG. 5 is a view of one of a plurality of displays displayed in a display device of the system of FIG. 1.

After the password as well as the operator ID has been entered, step S3 is implemented to request the supervisor operator to select at least one from among a plurality of various commands, in accordance with which the system 12 is controllable. The selected command or commands are valid commands which can be inputted by each operator. A valid-command group, constituted by at least one of the various commands that is inputtable to the control device, is thus formed for each operator. The above-described suitable-mode-establishing-data input command, which is adapted to be inputtable exclusively by the supervisor operator in the present embodiment, can be considered to be one of the valid commands. In step S3, i.e., in the selection of the valid commands, all the commands are displayed in the display device 170 as shown in FIG. 5, so that the supervisor operator can determine the valid commands available for each operator, by selecting ones among from all the commands displayed in the display device 170. The thus selected commands are stored as the valid commands in RAM 186 of the host computer 180.

Step S3 is followed by step S4 which is implemented to request the supervisor operator to select the display language in which the information is displayed in the display device 170. The supervisor operator selects one from among a plurality of languages, for example, English, Japanese, Germany, French, Chinese, Portuguese and Spanish, which one is the most suitable for each operator. The thus selected language is stored as the display language in RAM 186. In the example illustrated in FIG. 5, English is selected as the display language for the supervisor operator (Super User) and the non-supervisor operator A, while Japanese is selected as the display language for the non-supervisor operator B. One execution of the suitable-mode-establishing-data input routine is terminated with the implementation of step S4. This suitable-mode-establishing-data input routine is executed for each of the plurality of operator, so that the valid commands and the display language suitable for each operator are selected. While the operator ID, the password, the valid commands and the display languages are entered or selected in this order in the present embodiment, this order may be changed.

In the present embodiment, the supervisor operator is allowed to input or edit the suitable-mode establishing data while the non-supervisor operators are not allowed to do it. As long as the supervisor operator logs on the host computer 180, the input or edit of the suitable-mode establishing data can be made at a desired point of time, for example, for registering a new operator and defining the operating environment for the new operator, or for modifying the operating environment which has been defined before.

Figure 6:
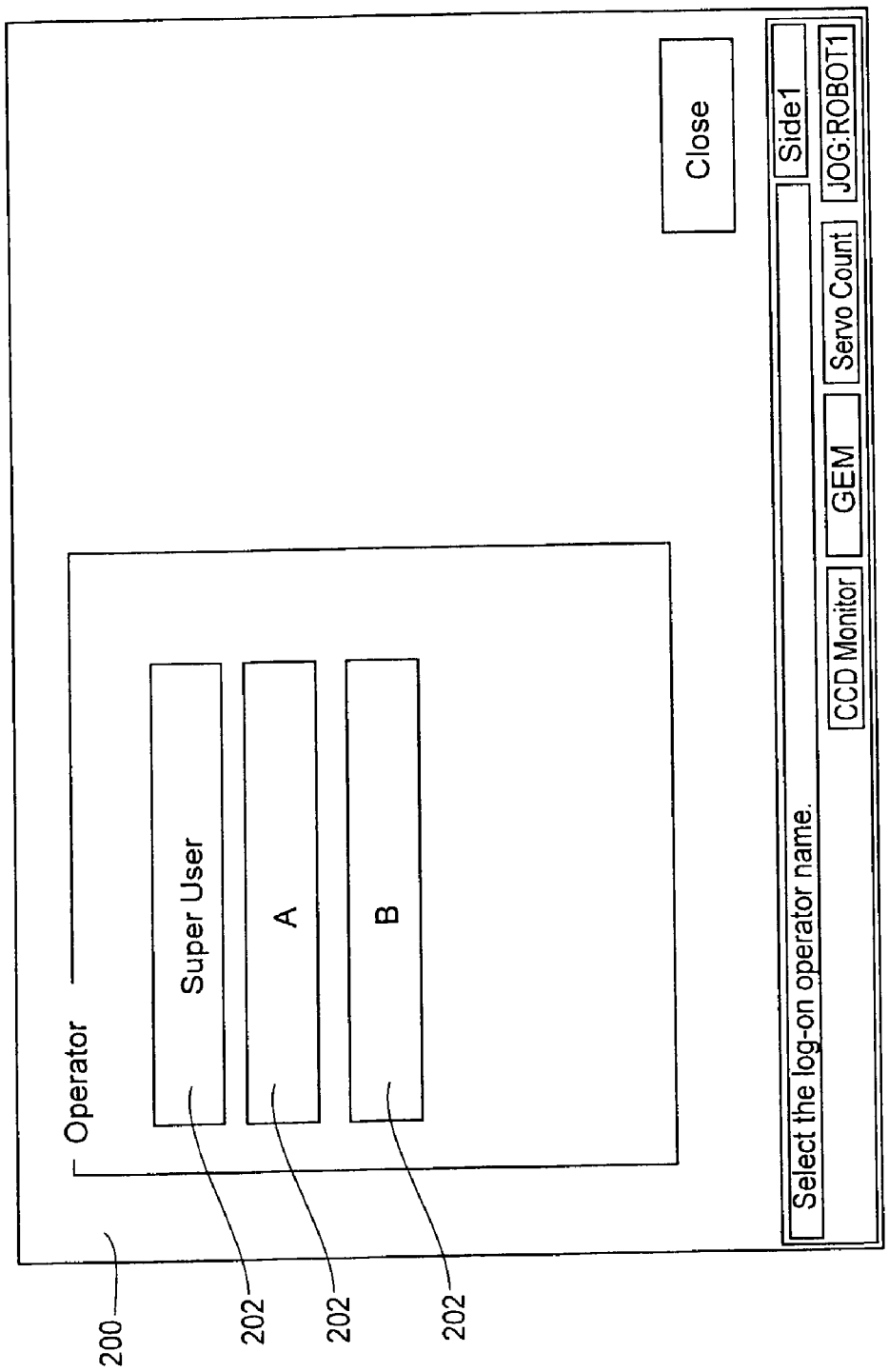
FIG. 6 is a view of a log-on display as another one of the plurality of displays displayed in the display device of the system of FIG. 1.

When the inputting or editing of the suitable-mode establishing data is completed, a log-on display 200 is displayed in the display device 170 as shown in FIG. 6, for thereby waiting for a logon of one of the supervisor operator (Super User) and the non-supervisor operators A, B which have been registered as the plurality of operators of the system 12. When one of the registered operators logs on the host computer 180, an operating-environment establishing routine is executed for establishing an operating environment suitable for the logon operator. A program for executing this operating-environment establishing routine is stored in the RAM 186 of the host computer 180. Referring to the flow chart of FIG. 4, the operating-environment establishing routine will be described.

This operating-environment establishing routine is initiated with step S10 which is implemented to wait for one of the registered operators to log on the host computer 180. In this step S10, the operator ID data of the registered operators who are authorized to operate the system 12 are loaded from the host computer 180, so that the names of the registered operators are represented by ID buttons 202 on the log-on display 200 in the display device 170 of the control panel 178. When one of the ID buttons 202 has been clicked or pressed, a message requesting to enter a password is displayed. The logon procedure of the operator is completed by entering the correct password of the operator through the keyboard 172. In the present embodiment in which the operator ID data and the password are stored in a magnetic storage in the form of an ID card (not shown), the logon can be made also by activating the ID reading device 176 to read the ID card.

Figure 7:
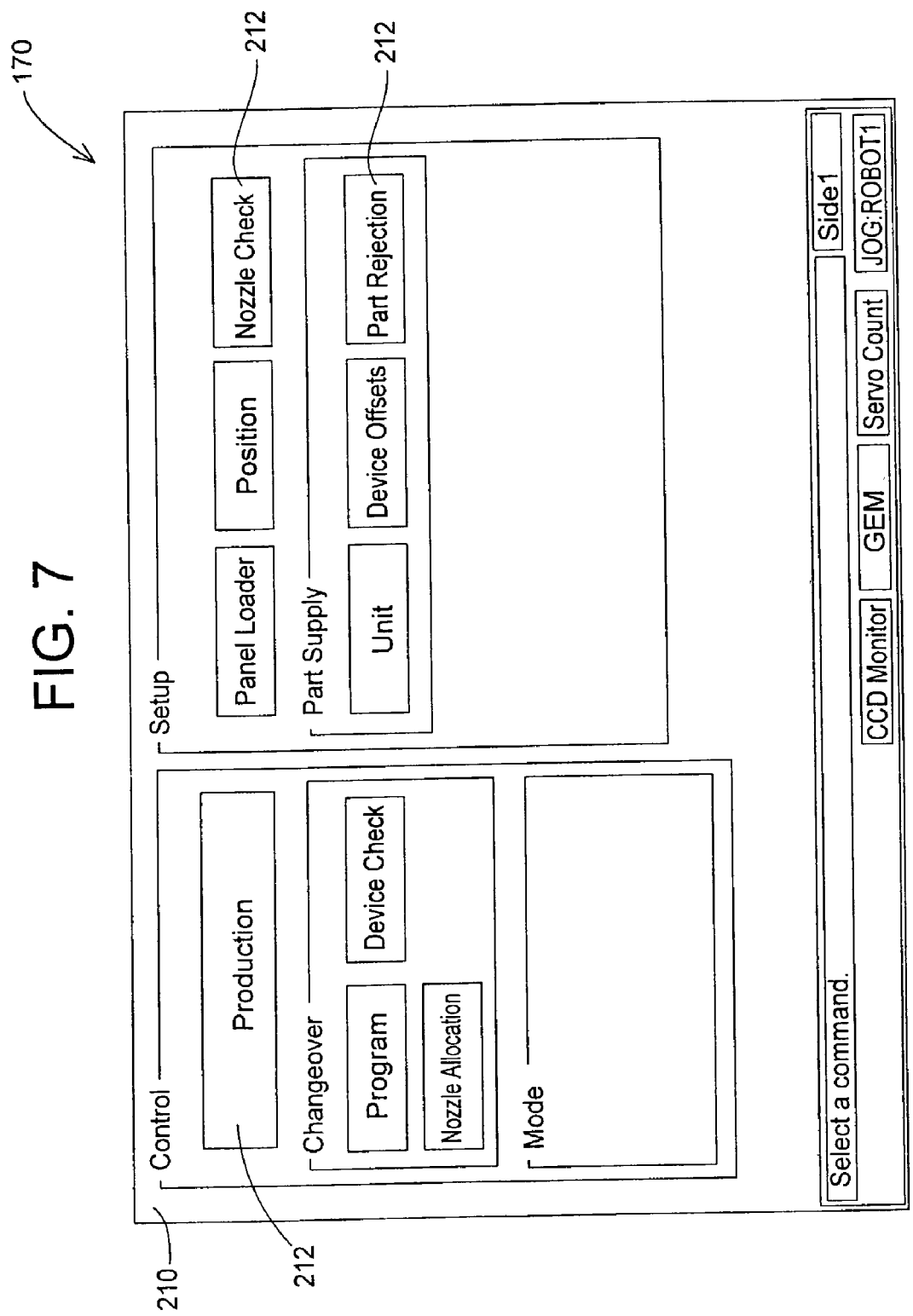
FIG. 7 is a view of a main display as still another one of the plurality of displays when the main display is placed in one of a plurality of display modes.

When one of the operators has thus logged on the host computer 180 through the controller 148, step S10 is followed by step S11 in which the suitable-mode establishing data corresponding to the logon operator are loaded from the RAM 186 of the host computer 180. Step S12 is then implemented to establish the display language used for displaying the message or information in the display device 170. Step S13 is implemented to establish the valid commands which can be inputted by the operator to the control device. Step S13 is followed by step S14 which is implemented to switch the log-on display 200 to a main display 210 in which the established valid commands are displayed in the established display language, as shown in FIG. 7.

The suitable-mode establishing data stored in the RAM 186 of the host computer 180 includes command establishing data related to the valid commands, and language establishing data related to the display language. The command establishing data and the language establishing data are loaded from the RAM 186 of the host computer 180 so that the valid commands are represented by command buttons 212 in the selected display language (in English in the example illustrated in the figures) on the main display 210. The operator can point or click the command buttons 212 as valid-command indicators which are displayed on the main display 210, by using the mouse 174, for thereby inputting the command to the control device so as to operate the system 12. Where the log-on operator is a non-supervisor operator, the valid commands are displayed on the main display 210 as shown in FIG. 7, in which the valid commands are limited to commands required for the routine operation of the system 12 such as a command used for changing over from the set of feeders 26 to another set of feeders 26. It is noted that the ID buttons 202 and the command buttons 212 can be pointed or clicked not only by using the mouse 174 but also by using the any other pointing devices such as a trackball, lightpen, touchscreen and joystick.

A command or commands, which are not included in the valid commands, are invalidated so as to be unacceptable by the control device of the system 12. The invalid commands are not displayed in the display device 170, for preventing the operator from confusing the invalid commands with the valid commands.

In the present embodiment, the valid commands represented by the command buttons 212 in the display device 170 can be inputted to the control device not only by using the pointing devices but also by entering predetermined code data through the keyboard 172. The invalid commands, which are not displayed in the display device 170, are completely invalidated so that the invalid commands can not be inputted even through the keyboard 172. Thus, the operator is guided by the display of the display device 170 which displays only the valid commands currently inputtable to the control device, for appropriately operating the system 12. The deletion of the invalid command from the display of the display device 170 serves to prevent the confusion of the invalid commands with the valid commands, and also serves to save the limited space of the display.

Figure 4:
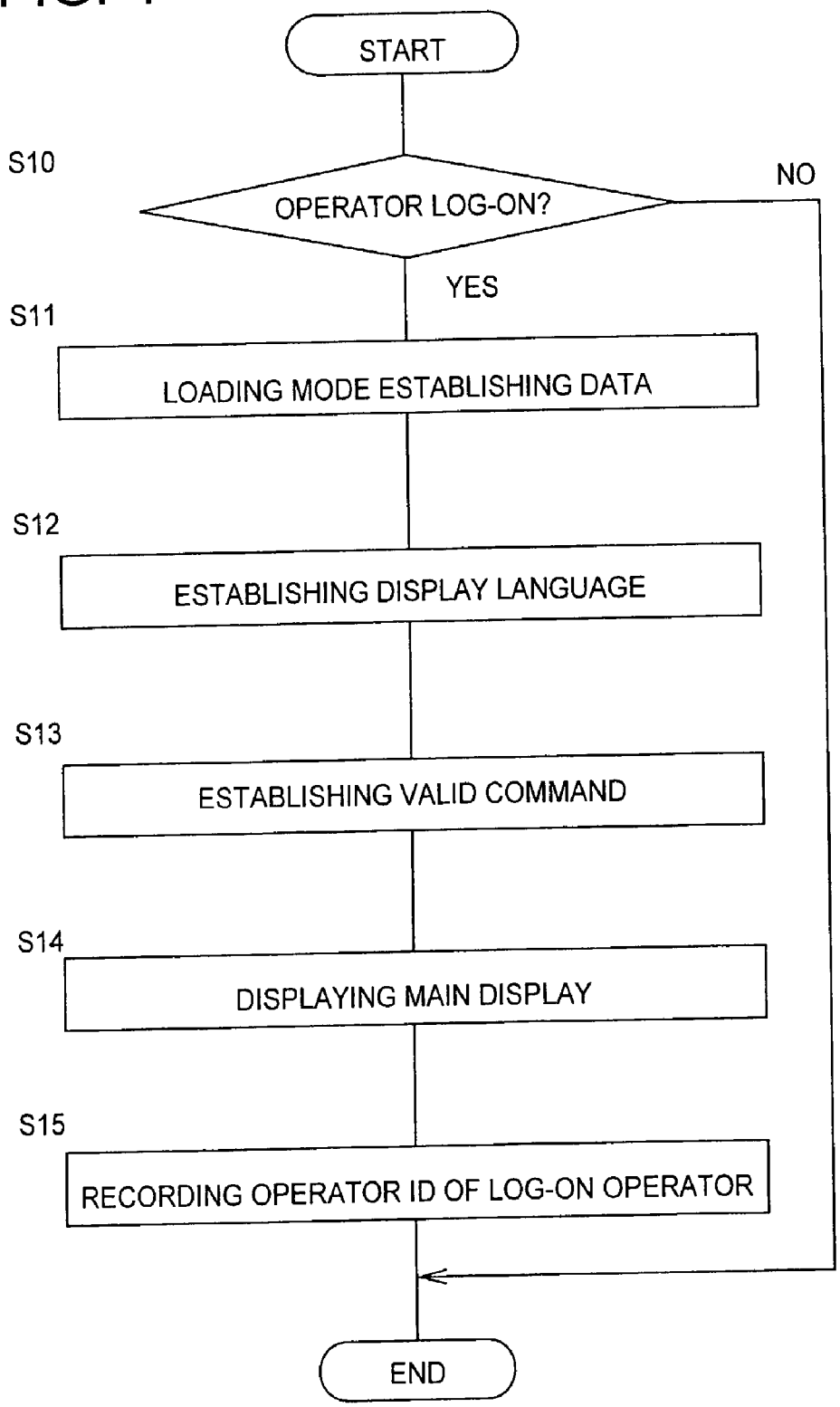
FIG. 4 is a flow chart illustrating an operating-environment establishing routine executed according to a program stored in a RAM of the control device of FIG. 2.

Step S15 is implemented to store or record the operator ID data as operator personal data representative of information related to the currently assigned operator, i.e., the operator who has logged on the host computer 180. The operator personal data are combined with outcome data representative of outcome achieved by the operator, so as to serve to clarify one of the plurality of operators who was engaged in the operation on each printed-wiring board in the system 12. One cycle of execution of the operating-environment establishing routine of FIG. 4 is terminated with this step S15.

Figure 8:
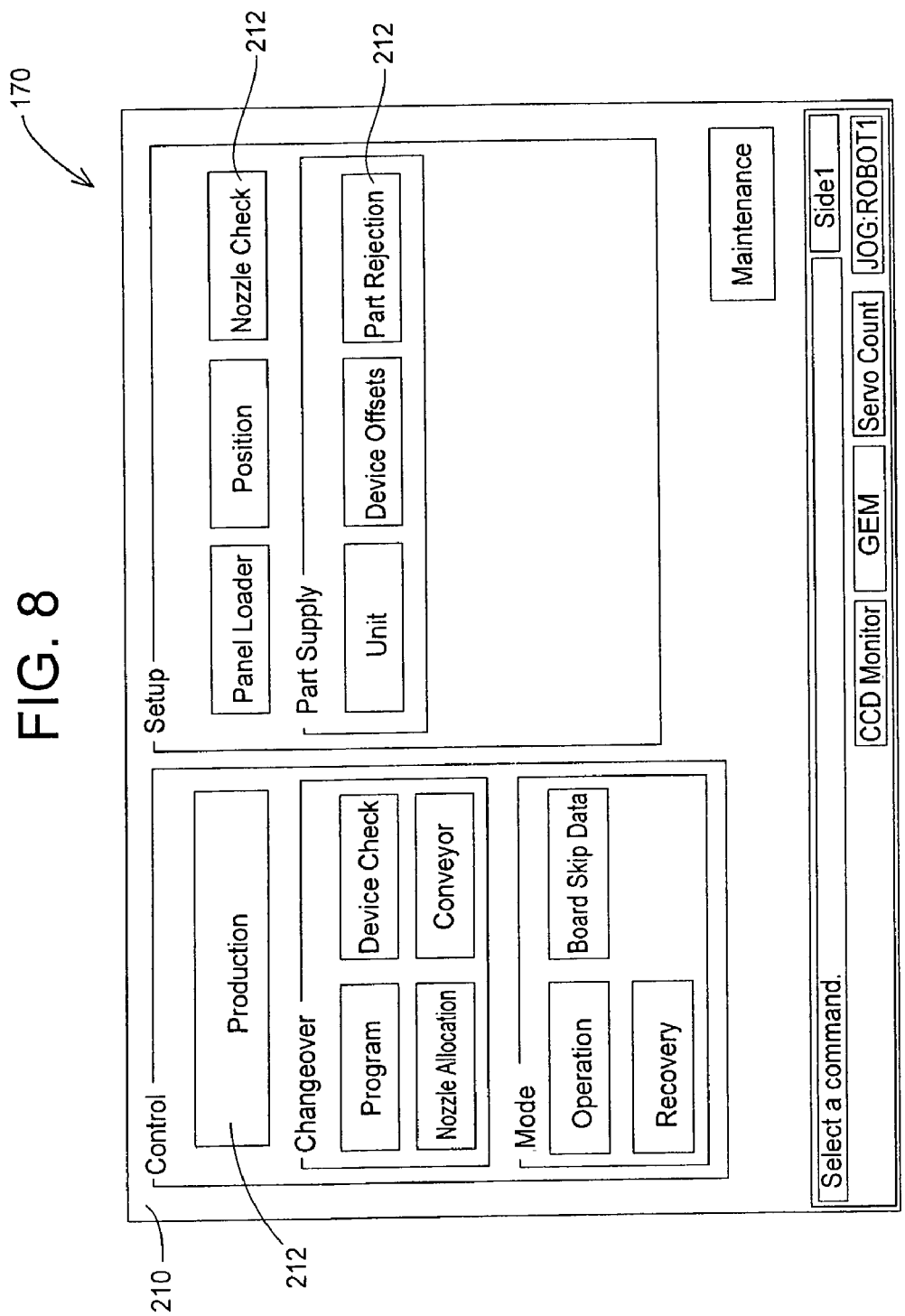
FIG. 8 is a view of the main display when the main display is placed in another one of the plurality of display modes.

There will be described a case where the system 12 has to be cared or recovered by the supervisor operator, for example, in the event of a certain defect or trouble with the system 12. In such a case, the supervisor operator is informed by the currently assigned non-supervisor operator of the fact that the trouble of the system 12 is not resolvable by the non-supervisor operator. The main display 210, which has served the non-supervisor operator, is then switched to the log-on display 200, so that a logon of the supervisor operator is awaited. When the supervisor operator has logged on the host computer 180, the above-described operating-environment establishing routine is executed whereby the main display 210 is placed in the display mode in which the valid commands inputtable by the supervisor operator are displayed in the display language suitable for the supervisor (in English in the illustrated example), as shown in FIG. 8. That is, in response to the logon of the supervisor operator, the suitable-mode establishing data associated to the supervisor operator are loaded from the RAM 186 of the host computer 180, so that the display language and the valid commands are automatically established on the basis of the loaded suitable-mode establishing data. As shown in FIG. 8, the valid commands inputtable by the supervisor operator include, in addition to the routine commands inputtable by the non-supervisor operator, the above-described suitable-mode-establishing-data input command and recovery commands required for recovering functions of the system 12 in the event of a certain defect or trouble with the system 12. The supervisor operator selects one or ones from among the valid commands for carrying out currently required procedures. After the required procedures have been carried out, the main display 210 is switched to the log-on display 200 so that the non-supervisor operator newly logs on the control device for restarting his operation in the system 12.

As described above, the valid commands available by the supervisor operator are all validated one time in response to the logon of the supervisor operator, so as to be inputtable to the control device. This arrangement eliminates the necessity of repeating a certain procedure (such as an input of password) the same number of times as the number of the commands which should be inputted to the control device, thereby making it possible to operate the system 12 with an improved efficiency.

The valid commands inputtable by the supervisor operator further include an evaluation command required for evaluating the work achieved in the system 12. The control device of the system 12 includes an outcome-data generating portion for generating outcome data related to each of the printed-wring boards 40 on which the electronic components have been mounted in the system 12. The outcome data will be described in detail.

While the electronic components are being mounted onto the printed-wiring boards 40, the controller 148 executes an outcome-data generating routine for generating the outcome data representative of board ID, recipe, operation time and operation status, which are displayed in the display device 170 as shown in FIG. 9. In the present embodiment, the control device of the system 12 further includes a data combining portion for combining operator personal data representative of information related to the currently assigned operator, with the outcome data. That is, until the operator logs off the control device, the operator personal data keeps to be combined with the outcome data which are generated concurrently with the work of mounting the electronic components onto the printed-wiring boards 40. It is noted that the operator personal data may include, in addition to the operator ID data, data representing his job experience years, age and sex.

The outcome data further include data representative of error ratio or rate of each function of the system 12 such as a nozzle error rate, feeder error rate and slot error rate which can be displayed in the display device 170. The nozzle error rate will be described.

Figure 10:
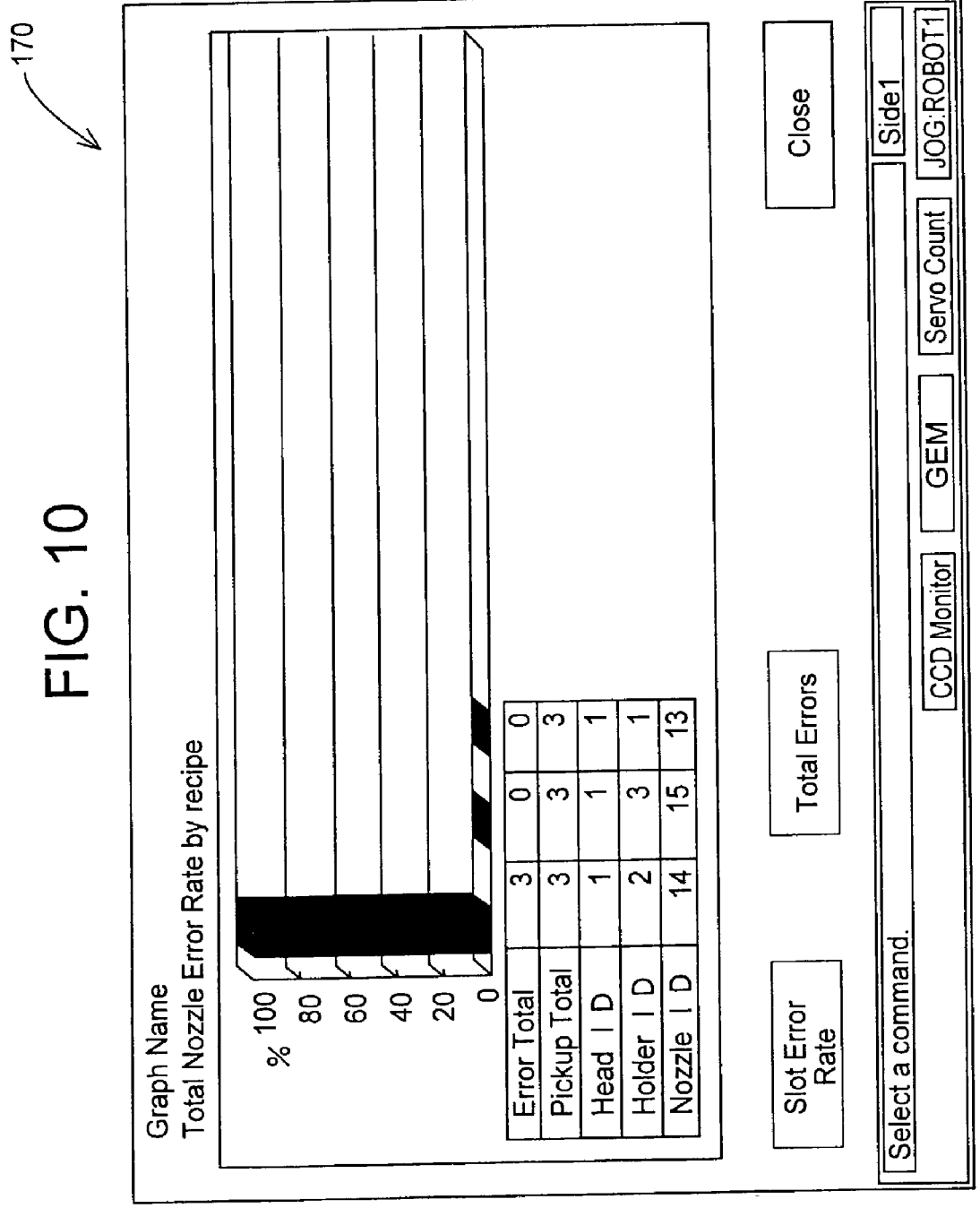
FIG. 10 is a view of still another one of the plurality of displays.

The nozzle error rate stands for a rate or ratio of the number of times at which each suction nozzle has failed to pick up the electronic components, to the number of times at which the suction nozzle has successfully picked up the electronic components. This ratio is graphed as shown in FIG. 10. Each of the suction nozzles can be identified on the basis of a nozzle ID representative of kind of the suction nozzle, a nozzle-holder ID representative of a nozzle holder holding the suction nozzle and a head ID representative of a holding head holding the nozzle holder. In the example illustrated in FIG. 10, the display device 170 indicates that the suction nozzle of code 14, which is held by the nozzle holder of code 2 held by the holding head of code 1, has committed errors with an error ratio of 100%, and that the other suction nozzles have committed no error.

The supervisor operator can monitor situation of the operation of the system 12, depending upon the outcome data displayed in the display device 170, whereby any defect or trouble of the system 12 can be appropriately dealt with by the supervisor operator. Further, it is possible to easily identify the operator who has produced each circuit board in the system 12, owing to the outcome data combined with the operator personal data.

In the present embodiment, as is apparent from the above explanation, a portion of the RAM 186 of the host computer 180 constitutes the above-described suitable-mode-establishing-data storing portion. A portion of the operating-environment establishing routine program which is assigned to implement steps S12–S14 constitutes a suitable-mode establishing portion. The display device 170, the key board 172, the mouse 174, the ID reading device 176, the ID buttons 202 and the command buttons 212 constitute changeable devices each of which is changeable to each of its plurality of different modes. The controller 148 and the host computer 180 cooperate to constitute the above-described control device. The keyboard 172, the mouse 174, the ID reading device 176 and the ID buttons 202 cooperate to constitute an ID-data input device. The keyboard 172, the mouse 174 and the ID reading device 176 cooperate to constitute a command input device.

In the present embodiment in which the valid command group, the display language and the operator personal data are newly established each time one of the plurality of operators logs on the control device, the suitable mode is easily established in each function or device. Further, since the outcome data are combined with the operator personal data, it is easy to evaluate the achievement of each operator.

While the presently preferred embodiment of the present invention has been described above in detail, it is to be understood that the invention is not limited to the details of the illustrated embodiment, but may be otherwise embodied.

In the above-described embodiment, the suitable-mode establishing portion of the control device includes the display-mode establishing portion for establishing the suitable display language and the command-input-mode establishing portion for establishing the suitable command input mode. However, the suitable-mode establishing portion may further include a keyboard-input-mode establishing portion for establishing one of a plurality of different keyboard input modes. In this case, the keyboard 172 may be adapted to be changeable to one of the plurality of different keyboard input modes, which one is suitable for the display language. Further, the data input device of the system 12 may include a plurality of keyboards 172 which are selectively used depending upon of the display language.

In the above-described embodiment, the suitable-mode establishing data are inputted, by manipulating the control panel 178 connected to the controller 148, to the RAM 186 of the host computer 180 via the controller 148 which is connected to the host computer 180. However, it is also possible to input the suitable-mode establishing data to a control panel which is connected directly to the host computer 180 but is not connected to the controller 148 of the system 12, so that the suitable-mode establishing data are inputted directly to the host computer 180. In this case, if a plurality of systems 12 are connected to the host computer 180, it is preferable to input the suitable-mode establishing data to the host computer 180 in such a manner that permits the host computer 180 to recognize which one of the plurality of systems 12 the inputted suitable-mode establishing data are related to.

In the above-described embodiment, the RAM 186 of the host computer 180 includes the suitable-mode-establishing-data storing portion so that the suitable-mode establishing data are inputted to the RAM 186 of the host computer 180. However, the host computer 180 is not essential. That is, the suitable- mode-establishing-data storing portion may be provided in the RAM 154 of the computer 158 of the controller 148 rather than in the RAM 186 of the host computer 180, so that the suitable-mode establishing data are inputted to the RAM 154 of the computer 158.

Figure 11:
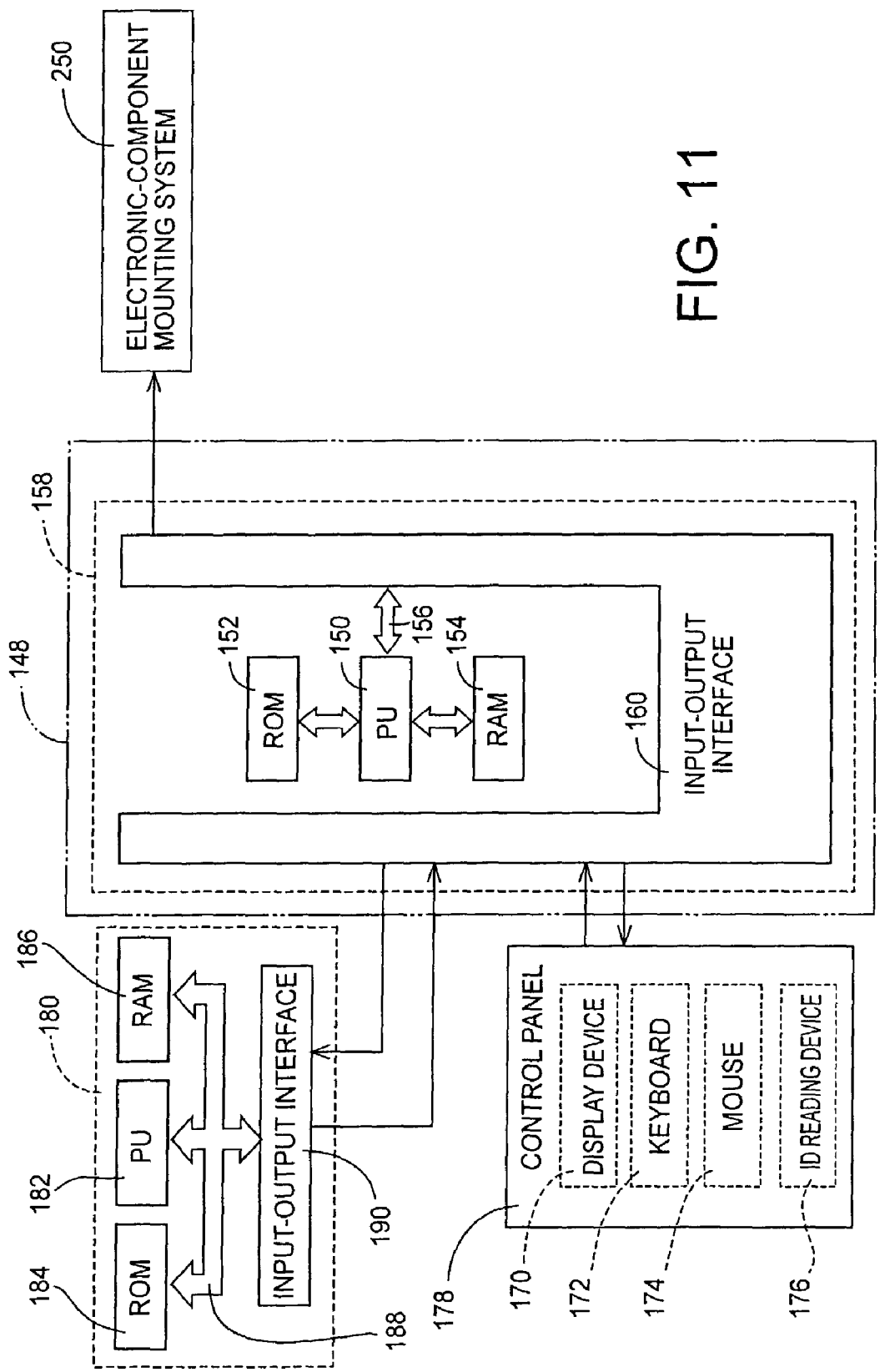
FIG. 11 is a block diagram showing an electronic-component mounting system constructed according to another embodiment of the invention.
Figure 12:
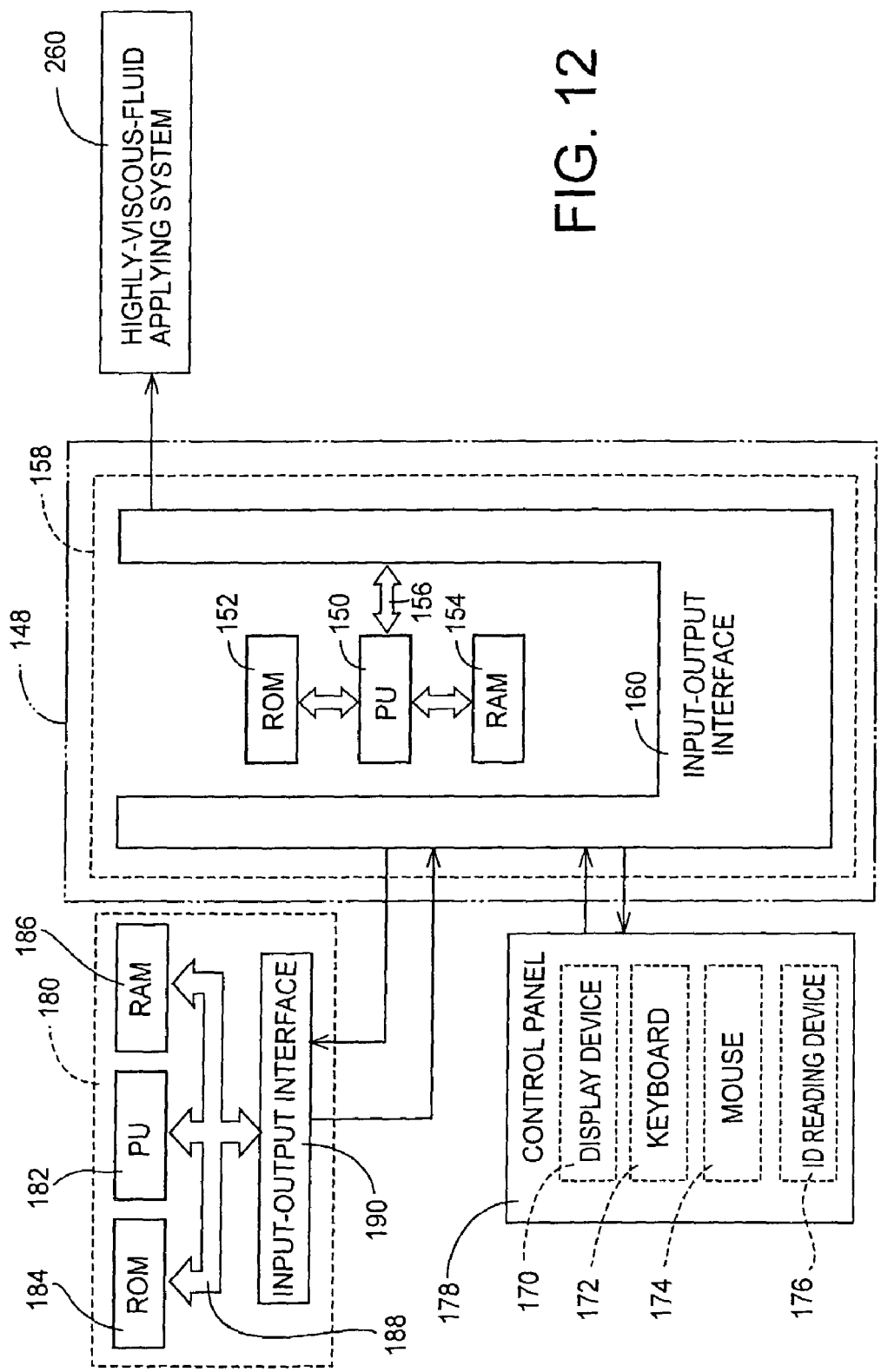
FIG. 12 is a block diagram showing a printing system constructed according to still another embodiment of the invention.

In the above-described embodiment, the board work system is provided by the electronic-component mounting system 12 that is of a so-called "index type" in which the holding heads 92 are intermittently rotated by the intermittent rotary disk 90 such that the holding heads 92 are sequentially indexed or positioned in the component mounting position. However, the board work system may be provided by any other type of electronic-component mounting system such as a so-called "XY robot type" electronic-component mounting system 250 (see FIG. 11) which is quipped with a XY robot for moving the holding head in the X-axis and Y-axis directions such that the holding head can take a linear movement having X-axis and Y-axis components. Further, the board work system may be provided by also a printing system for printing an adhesive, creamed solder or other print material on a surface of the board. The printing system may be a viscous-fluid applying system 260 (see FIG. 12) equipped with a dispenser unit for applying a highly-viscous fluid onto predetermined spot portions of the board, or alternatively may be a screen printing system 270 (see FIG. 13) for printing a highly-viscous fluid on a predetermined portions of the board, by forcing the fluid into apertures of a mask screen, which is disposed on the board such that the apertures of the mask screen are aligned with the predetermined portions of the board. Since the constructions of these systems 250, 260, 270 are well known, a further description of each of the systems 250, 260, 270 is not provided in this specification. It is noted that the board work system may be provided by any combinations of these systems 250, 260, 270.

While the presently preferred embodiments of this invention have been described above in detail by reference to the accompanying drawings, for illustrative purpose only, it is to be further understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A process of establishing an operating environment of a board work system operable by a plurality of operators who are assigned in turn to operate said system for achieving at least one predetermined work on a circuit board, said board work system including (a) a plurality of mode-changeable devices, each device having a plurality of different modes and changeable between said plurality of different modes and (b) a control device which controls said plurality of mode-changeable devices and receives operator ID data of each one of the operators so as to recognize which one of the operators is currently assigned to operate said system, said process comprising:
   a suitable-mode-establishing-data preparing step of preparing suitable-mode establishing data representative of one of said plurality of different modes which is to be established in each of all said mode-changeable devices as the operating environment during operation of said system by each one of the operators;
   a suitable-mode-establishing-data storing step of storing said suitable-mode establishing data in a suitable-mode-establishing-data storing portion of said control device; and
   a suitable-mode establishing step, which is implemented by said control device, of establishing one of said plurality of different modes in each of all said mode-changeable devices, on the basis of said suitable-mode-establishing data and according to said operator ID data received by said control device.

2. A computer program for executing the process defined in claim 1.

3. A recording medium which stores the program defined in claim 2 and which is accessible by a computer so that the stored program can be read by the computer.

4. A board work system operable by a plurality of operators who are assigned in turn to operate said system for achieving at least one predetermined work on a circuit board, said system comprising:
   a plurality of mode-changeable devices, each device having a plurality of different modes and changeable between said plurality of different modes;
   a control device which controls said plurality of mode-changeable devices, and receives operator ID data identifying each one of the operators, so as to recognize which one of the operators is currently assigned to operate said system; and
   an ID-data input device operable to input said operator ID data to said control device,
   wherein said control device includes:
      a suitable-mode-establishing-data storing portion which stores suitable-mode establishing data associating said operator ID data of each one of the operators, with one of said plurality of different modes that is to be established in each of all said mode-changeable devices during operation of said system by said each one of the operators; and
      a suitable-mode establishing portion which establishes one of said plurality of different modes in each of all said mode changeable devices, on the basis of said suitable-mode establishing data and according to said operator ID data inputted to said control device.

5. A board work system according to claim 4, wherein said ID-data input device includes a manual input device operable manually by the operator.

6. A board work system according to claim 4, wherein said ID-data input device includes a reading device which accesses a recording medium storing said operator ID data, for reading said operator ID data stored in said recording medium.

7. A board work system according to claim 4, wherein said control device includes:
   an outcome-data generating portion which generates outcome data representative of outcome achieved by each one of the operators in said system; and
   a data combining portion which combines operator personal data representative of information related to each one of the operators, with said outcome data of a corresponding one of the operators.

8. A board work system according to claim 4, further comprising a component mounting device which mounts an electric component onto the circuit board.

9. A board work system according to claim 4, further comprising:
   a board holding device which holds the circuit board positioned in a predetermined position;
   an applying head which applies a viscous fluid to a plurality of predetermined portions of the circuit board which is held by said board holding device; and
   a relative movement device which moves said board holding device and said applying head relative to each other.

10. A board work system according to claim 4, further comprising a screen printing device which prints a print material on a plurality of predetermined portions of the circuit board, by forcing the print material into apertures of a mask screen, which is disposed on the circuit board such that said apertures of said mask screen are aligned with said plurality of predetermined portions of the circuit board.

11. A board work system according to claim 4,
   wherein said plurality of mode-changeable devices includes (a) a display device which displays information facilitating the operation of said system by each one of the operators and which is changeable between a plurality of different display modes as said plurality of different modes, and (b) a data input device which is operable to input data to said control device and which is changeable between a plurality of different input modes as said plurality of different modes,
   and wherein said suitable-mode establishing portion includes (i) a display-mode establishing portion which establishes one of said plurality of different display modes in said display device, on the basis of said suitable-mode establishing data and according to said operator ID data inputted to said control device, and (ii) an input-mode establishing portion which establishes one of said plurality of different input modes in said data input device, on the basis of said suitable-mode establishing data and according to said operator ID data inputted to said control device.

12. A board work system according to claim 11,
wherein said display device displays the information in a selected one of a plurality of different languages,
wherein said display-mode establishing portion of said suitable-mode establishing portion includes a display-language selecting portion which selects one of said plurality of different languages on the basis of said suitable-mode establishing data and according to said operator ID data inputted to said control device,
wherein said data input device includes a keyboard which is changeable between a plurality of different keyboard input modes as said plurality of different input modes,
and wherein said input-mode establishing portion of said suitable-mode establishing portion includes a keyboard-input-mode establishing portion which establishes one of said plurality of different keyboard input modes in said keyboard, on the basis of said suitable-mode establishing data and according to said operator ID data inputted to said control device.

13. A board work system according to claim 11, controllable in accordance with various commands which are inputted to said control device,
wherein said data input device includes a command input device changeable between a plurality of different command input modes in which respective valid-command groups are constituted differently from each other, such that each one of said valid-command groups is constituted by at least one of the various commands that can be accepted to said control device through said command input device while said command input device is placed in a corresponding one of said plurality of different command input modes,
and wherein said suitable-mode establishing portion includes a command-input-mode establishing portion which establishes one of said plurality of different command input modes in said command input device, on the basis of said suitable-mode establishing data and according to said operator ID data inputted to said control device.

14. A board work system according to claim 11, controllable in accordance with various commands which are inputted to said control device,
wherein said display device includes a command input device changeable between a plurality of different command input modes in which respective valid-command groups are constituted differently from each other, such that each one of said valid-command groups is constituted by at least one of the various commands that can be accepted to said control device through said command input device while said command input device is placed in a corresponding one of said plurality of different command input modes,
wherein said suitable-mode establishing portion includes a command-input-mode establishing portion which establishes one of said plurality of different command input modes in said command input device, on the basis of said suitable-mode establishing data and according to said operator ID data inputted to said control device,
and wherein said command input device includes a valid-command indicator which indicates said at least one of the various commands constituting each one of said valid-command groups, so that each one of the operators is informed that said at least one of the various commands can be accepted to said control device.

15. A board work system operable by a plurality of operators who are assigned in turn to operates said system for achieving at least one predetermined work on a circuit board, said system comprising:
a display device having a plurality of different language modes, and operable to display, in a selected one of a plurality of different languages,
information facilitating operation of said system by each one of the operators;
a control device which controls said display device, and receives operator ID data identifying each one of the operators, so as to recognize which one of the operators is currently assigned to operate said system; and
an ID-data input device operable to input said operator ID data to said control device,
wherein said control device includes:
a suitable-language-mode-establishing-data storing portion which stores suitable-language-mode establishing data associating said operator ID data of each one of the operators, with one of said plurality of different language modes that is to be established in said display device during operation of said system by each one of the operators; and
a display-language selecting portion which selects one of said plurality of different language modes that is to be established, on the basis of said suitable-language-mode establishing data and according to said operator ID data inputted to said control device.

16. A board work system operable by a plurality of operators who are assigned in turn to operates said system for achieving at least one predetermined work on a circuit board, said system comprising:
a control device which controls at least one function included in said board system, and receives operator ID data identifying each one of the operators, so as to recognize which one of the operators is currently assigned to operate said system;
an ID-data input device operable to input said operator ID data to said control device; and
a data input device having a plurality of different input modes and operable to input data to said control device,
wherein said control device further controls said data input devices, and includes:
a suitable-input-mode-establishing-data storing portion which stores suitable-input-mode establishing data associating said operator ID data of each one of the operators, with one of said plurality of different input modes that is to be established in said data input device during operation of said system by each one of the operators; and
an input-mode establishing portion which establishes one of said plurality of different input modes in said input device, on the basis of said suitable-input-mode establishing data and according to said operator ID data inputted to said control device.

17. A board work system according to claim 16, wherein said data input device includes a keyboard which is changeable between a plurality of different keyboard input modes as said plurality of different input modes,
and wherein said input-mode establishing portion includes a keyboard-input-mode establishing portion which establishes one of said plurality of different keyboard input modes in said keyboard, on the basis of said suitable-input-mode establishing data and according to said operator ID data inputted to said control device.

18. A board work system according to claim 16, controllable in accordance with various commands which are inputted to said control device,
wherein said data input device includes a command input device changeable between a plurality of different command input modes in which respective valid-command groups are constituted differently from each other, such that each one of said valid-command groups is constituted by at least one of the various commands that can be accepted to said control device through said command input device while said command input device is placed in a corresponding one of said plurality of different command input modes,
and wherein said input-mode establishing portion includes a command-input-mode establishing portion which establishes one of said plurality of different command input modes in said command input device, on the basis of said suitable-input-mode establishing data and according to said operator ID data inputted to said control device.

19. A board work system according to claim 18, wherein said command input device includes a valid-command indicator which indicates said at least one of the various commands constituting each one of said valid-command groups, so that each one of the operators is informed that said at least one of the various commands can be accepted to said control device.

20. A board work system according to claim 16, controllable in accordance with various commands which are inputted to said control device, and comprising a display device which displays information facilitating the operation of said system by each one of the operators,
wherein said data input device includes a valid-command indicator which displays at least one of the various commands in said display device and which is changeable between a plurality of different indication modes, and a command select device which selects one of said at least one of the various commands that is displayed by said valid-command indicator, for thereby inputting the selected command to said control device,
and wherein said suitable-input-mode establishing portion includes a valid-command-indication-mode establishing portion which establishes one of said plurality of different indication modes in said valid-command indicator, on the basis of said suitable-input-mode establishing data and according to said operator ID data inputted to said control device.

21. A board work system operable by a plurality of operators who are assigned in turn to operate said system for achieving at least one predetermined work on a circuit board, said system comprising:
a control device which controls at least one function included in said board work system, and receives operator ID data identifying each one of the operators, so as to recognize which one of the operators is currently assigned to operate said system;
an ID-data input device operable to input said operator ID data to said control device;
a display device operable to display information facilitating operation of said system by each one of the operators; and
a data input device operable to input data to said control device,
wherein each of at least one of said display device and said data input device has a plurality of different language modes and is changeable between said plurality of different language modes,
wherein said control device further controls said at least one of said display device and said data input device, and includes:
a suitable-language-mode-establishing-data storing portion which stores suitable-language-mode establishing data associating said operator ID data of each one of the operators, with one of said plurality of different language modes that is to be established in each of said at least one of said display device and said data input device during operation of said system by said each one of the operators; and
a language selecting portion which selects one of said plurality of different language modes that is to be established in each of said at least one of said display device and said data input device, on the basis of said suitable-language-mode establishing data and according to said operator ID data inputted to said control device.

22. A plurality of board work systems in combination with a control device that controls said board work systems, said board work systems being operable by a plurality of operators who are assigned in turn to operate said systems for achieving at least one predetermined work on each of at least one circuit board,
each of said board work systems comprising at least one mode-changeable device having a plurality of different modes and changeable between said plurality of different modes,
said control device controlling said at least one mode-changeable device of each of said systems, and receiving operator ID data identifying each one of the operators, so as to recognize which one of the operators is currently assigned to operate said systems,
wherein said control device includes:
a suitable-mode-establishing-data storing portion which stores suitable-mode establishing data associating said operator ID data of each one of the operators, with one of said plurality of different modes that is to be established in each of said at least one mode-changeable device of each of all said board work systems during operation of said systems by said each one of the operators; and
a suitable-mode establishing portion which establishes one of said plurality of different modes in each of said at least one mode-changeable device of each of all said board work systems, on the basis of said suitable-mode establishing data and according to said operator ID data received by said control device.

23. A plurality of board work systems in combination with a control device according to claim 22, wherein said board work systems include at least two board work systems operable to achieve respective predetermined works that are different from each other.

* * * * *